US012607826B2

(12) United States Patent　　(10) Patent No.: US 12,607,826 B2

Yokoyama　　(45) Date of Patent: Apr. 21, 2026

(54) OPTICAL SYSTEM, LENS APPARATUS, AND IMAGE PICKUP APPARATUS

(71) Applicant: CANON KABUSHIKI KAISHA, Tokyo (JP)

(72) Inventor: Takayoshi Yokoyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 624 days.

(21) Appl. No.: 17/842,829

(22) Filed: Jun. 17, 2022

(65) Prior Publication Data

US 2023/0013707 A1　　Jan. 19, 2023

(30) Foreign Application Priority Data

Jul. 2, 2021　(JP) .................................. 2021-110916

(51) Int. Cl.
|  |  |
|---|---|
| G02B 9/12 | (2006.01) |
| G02B 13/16 | (2006.01) |
| G02B 17/04 | (2006.01) |

(52) U.S. Cl.
CPC .............. G02B 9/12 (2013.01); G02B 13/16 (2013.01); G02B 17/045 (2013.01)

(58) Field of Classification Search
CPC .... G02B 13/0045; G02B 13/0065–007; G02B 9/12; G02B 9/58; G02B 9/64; G02B 2027/132; G02B 2027/0132–0136; G02B 23/02; G02B 23/18; G02B 30/20–36; G02B 30/60; G02B 17/04; G02B 5/04; G02B 5/0284; G02B 5/08; G02B 15/143507; G02B 15/144507; G02B 15/145507; G02B 15/145513; G02B 15/145523; G02B 15/1465; G02B 27/642–646

See application file for complete search history.

(56) References Cited

U.S. PATENT DOCUMENTS

| | | | |
|---|---|---|---|
| 8,976,271 | B2 | 3/2015 | Yokoyama et al. |
| 9,977,220 | B2 | 5/2018 | Yokoyama et al. |
| | | (Continued) | |

FOREIGN PATENT DOCUMENTS

| | | |
|---|---|---|
| JP | 2012-003022 A | 1/2012 |
| JP | 2013-101213 A | 5/2013 |
| | (Continued) | |

OTHER PUBLICATIONS

Ex Parte Quayle Action dated May 2, 2023, issued by the USPTO in corresponding U.S. Appl. No. 17/842,831.

(Continued)

*Primary Examiner* — Bumsuk Won

*Assistant Examiner* — Samanvitha Sridhar

(74) *Attorney, Agent, or Firm* — Carter, DeLuca & Farrell LLP

(57) ABSTRACT

An optical system includes, in order from an object side to an image side, a first lens unit having a negative refractive power, a first reflective member, a second lens unit including an aperture diaphragm and having a positive refractive power, a second reflective member, and a third lens unit having a positive refractive power. Following inequalities are satisfied:

$$-1.27 < (f1/f)/Npr < -0.70$$

$$0.60 < f2/f3 < 1.60$$

where f represents a focal length of the optical system, f1 represents a focal length of the first lens unit, f2 represents a focal length of the second lens unit, f3 represents a focal length of the third lens unit, and NPr represents a refractive index of the first reflective member.

14 Claims, 6 Drawing Sheets

(56)     References Cited

U.S. PATENT DOCUMENTS

| | | | |
|---|---|---|---|
| 2006/0215277 A1 | 9/2006 | Sato | |
| 2007/0223109 A1 | 9/2007 | Tanaka | |
| 2013/0278731 A1 | 10/2013 | Inomoto | |
| 2019/0273848 A1* | 9/2019 | Satoh | G03B 17/17 |
| 2020/0014908 A1* | 1/2020 | Ebe | G02B 9/12 |
| 2020/0409246 A1* | 12/2020 | Minefuji | G02B 13/006 |
| 2022/0221688 A1 | 7/2022 | Yokoyama et al. | |

FOREIGN PATENT DOCUMENTS

| | | | |
|---|---|---|---|
| JP | WO2013129274 A1 * | 7/2015 | |
| JP | 5809936 B2 * | 11/2015 | |
| JP | 2020-008629 A | 1/2020 | |
| JP | 2020-042197 A | 3/2020 | |
| JP | 2020-139984 A | 9/2020 | |
| JP | 2021-006859 A | 1/2021 | |

OTHER PUBLICATIONS

Notice of Reasons for Refusal issued by the Japanese Patent Office on May 7, 2025 in corresponding JP Patent Application No. 2021-110916, with English translation.

Notice of Reasons for Refusal issued by the Japanese Patent Office on Jul. 22, 2025 in corresponding JP Patent Application No. 2021-110916, with English translation.

Notice of Reasons for Refusal issued by the Japanese Patent Office on May 7, 2025 in corresponding JP Patent Application No. 2021-110988, with English translation.

* cited by examiner

| d ——— | Δ S ——— | d ——— | g —·—·— |
| g - - - - | Δ M - - - - | | |

| Fno= 2.80 | ω= 105° | ω= 105° | ω= 105° |

| -0.20          0.20 | -0.20          0.20 | -5.0          5.0 | -0.025          0.025 |
| SPHERICAL ABERRATION | ASTIGMATISM | DISTORTION (%) | CHROMATIC ABERRATION |

OPTICAL SYSTEM, LENS APPARATUS, AND IMAGE PICKUP APPARATUS

BACKGROUND OF THE INVENTION

Field of the Invention

The present invention relates to an optical system that is suitable for a digital video camera, a digital still camera, a broadcasting camera, a silver-halide film camera, a monitoring camera, and the like.

Description of the Related Art

For providing a realistic image experience such as virtual reality, it is necessary to use a wide-angle lens or a fish-eye lens each of which can image a wide angle of view object. In particular, a fish-eye lens has an angle of view of 180° or more, and therefore can provide a wide field of view image with one lens.

As a method for acquiring a realistic image, an image pickup apparatus has been proposed that includes parallelly arranged two optical systems so as to provide parallax and that acquires a stereoscopic captured image. Japanese Patent Laid-Open No. ("JP") 2020-008629 discloses a method of providing an image pickup optical system in which one image sensor includes image circles of two parallelly arranged fish-eye lenses, and the image pickup optical system is capable of capturing a stereoscopic image when being used with a lens-interchangeable camera. Here, an image circle is an area of which a captured image can be viewed, and an outside of the image circle is an area of which an image cannot be viewed because a light amount is insufficient or optical performance extremely deteriorates.

When a realistic stereoscopic image is to be captured, a base length between the two parallelly arranged optical systems (a distance between surface vertexes of respective most object side lenses in the two optical systems (hereinafter, a lens disposed at a position closest to an object side in an optical system is referred to as "most object side lens" in the optical system)) may be set to about a distance between a human's eyes (generally, about 60 to 65 mm). When an image captured with parallax corresponding to the distance between the human's eyes is viewed, a realistic image experience can be provided. However, in general, sizes of image sensors are smaller than the distance between the human's eyes, and therefore if normal fish-eye lenses are arranged side by side, part of image circles of the optical systems are not included in the image sensor, which causes vignetting in an angle of view. Thus, JP 2020-008629 proposes an image pickup optical system that makes two image circles included in an image sensor by disposing two reflective members in a fish-eye lens and bending a light ray.

However, in the fish-eye lens including two reflective members, a total length is long so that spaces for placing the reflective members are ensured, and a lens closest to an object side and a lens closest to an image side are far from a diaphragm. As a result, when an angle of view is widened, outer diameters of the lenses are likely to increase. Further, in a case where a reflective member is disposed in an optical system having a wide angle of view, such as a fish-eye lens, a distribution of angles of light rays incident on a reflective surface becomes wider, and some light rays are not totally reflected on some areas of the reflective surface, which makes it necessary to form a metal film such as silver or aluminum on the reflective surface. This raises problems such as an increase in a cost and concern about corrosion of the metal film.

SUMMARY OF THE INVENTION

The present invention provides, with a low cost, a small-size and high-performance optical system capable of performing stereoscopic imaging in which one image sensor captures an image formed by each of two optical systems.

An optical system according to one aspect of the present disclosure includes, in order from an object side to an image side, a first lens unit having a negative refractive power, a first reflective member, a second lens unit including an aperture diaphragm and having a positive refractive power, a second reflective member, and a third lens unit having a positive refractive power. Following inequalities are satisfied:

$$-1.27 < (f1/f)/Npr < -0.70$$

$$0.60 < f2/f3 < 1.60$$

where f represents a focal length of the optical system, f1 represents a focal length of the first lens unit, f2 represents a focal length of the second lens unit, f3 represents a focal length of the third lens unit, and NPr represents a refractive index of the first reflective member.

A lens apparatus including the above optical system and an image pickup apparatus including the lens apparatus also constitute other aspects of the present disclosure.

Further features of the present invention will become apparent from the following description of exemplary embodiments with reference to the attached drawings.

DESCRIPTION OF THE EMBODIMENTS

Referring now to the accompanying drawings, a description will be given of an optical system according to each example. Each example arranges two optical systems parallelly with respect to an image sensor so as to obtain a stereoscopic image.

FIG. 1, FIG. 3, FIG. 5, FIG. 7, and FIG. 9 are sectional views of respective optical systems according to Examples 1, 2, 3, 4, and 5. The optical system according to each example, which will be described later, includes reflective prisms PR1 (first reflective member) and PR2 (second reflective member) as two reflective members, and an optical path is actually reflected twice (the number of times the optical path is bent is twice). Each of FIG. 1, FIG. 3, FIG. 5, FIG. 7, and FIG. 9 illustrates the sectional view of the optical system in a state of not reflecting the optical path.

FIG. 2, FIG. 4, FIG. 6, FIG. 8, and FIG. 10 are aberration diagrams of the optical systems focusing on objects at infinite distances according to Examples 1, 2, 3, 4, and 5, respectively.

Figure 1:
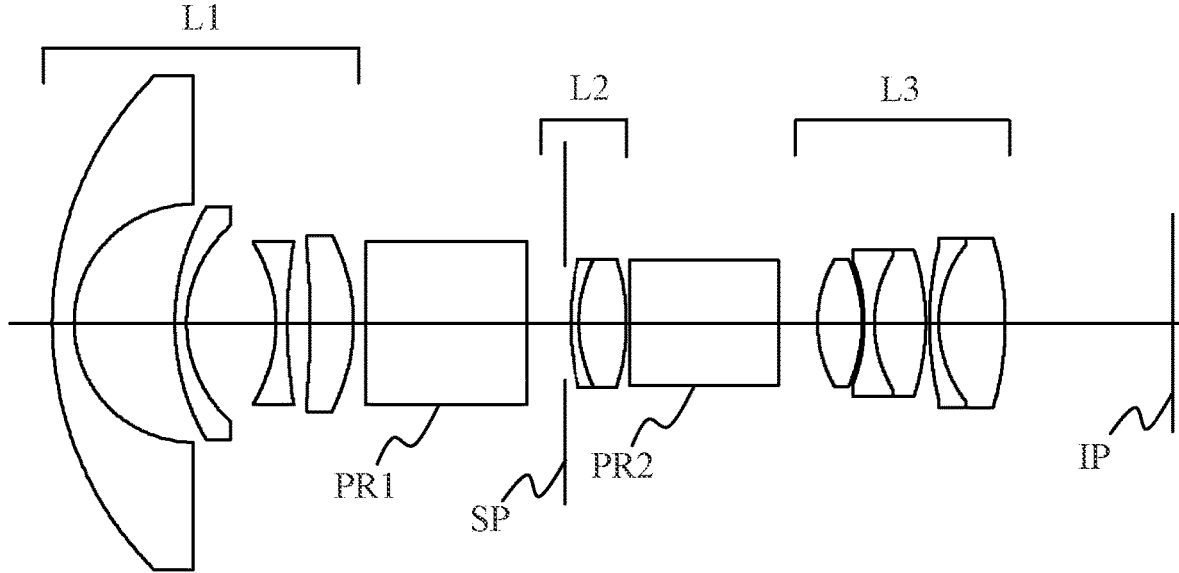
FIG. 1 is a sectional view of an optical system according to Example 1.
Figure 2:
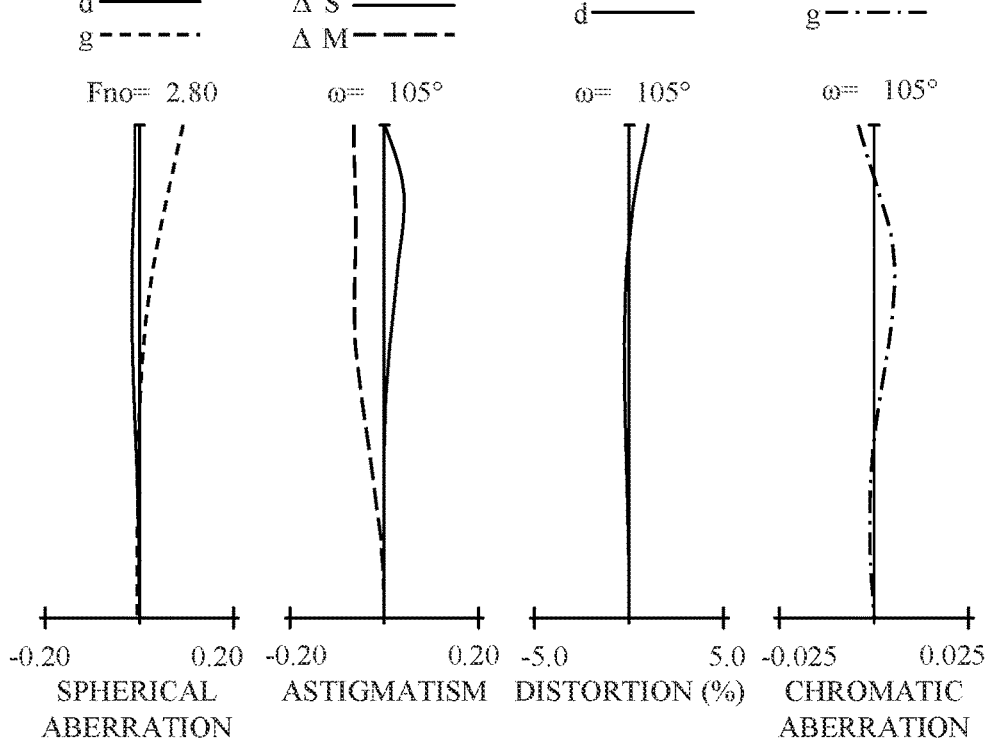
FIG. 2 is an aberration diagram of the optical system focusing on an object at an infinite distance according to Example 1.
Figure 3:
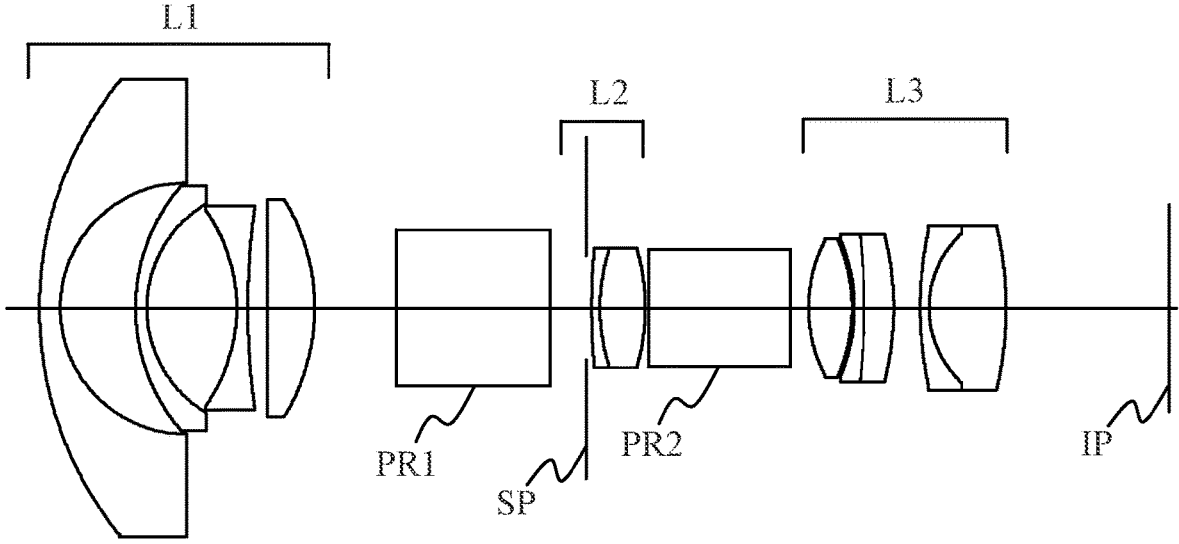
FIG. 3 is a sectional view of an optical system according to Example 2.
Figure 4:
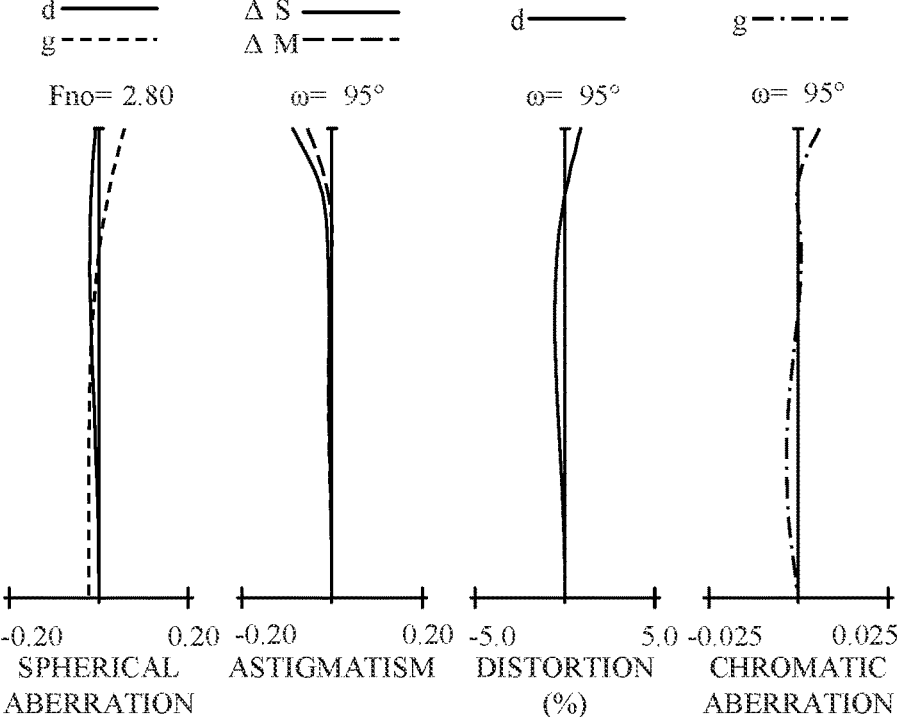
FIG. 4 is an aberration diagram of the optical system focusing on an object at an infinite distance according to Example 2.
Figure 5:
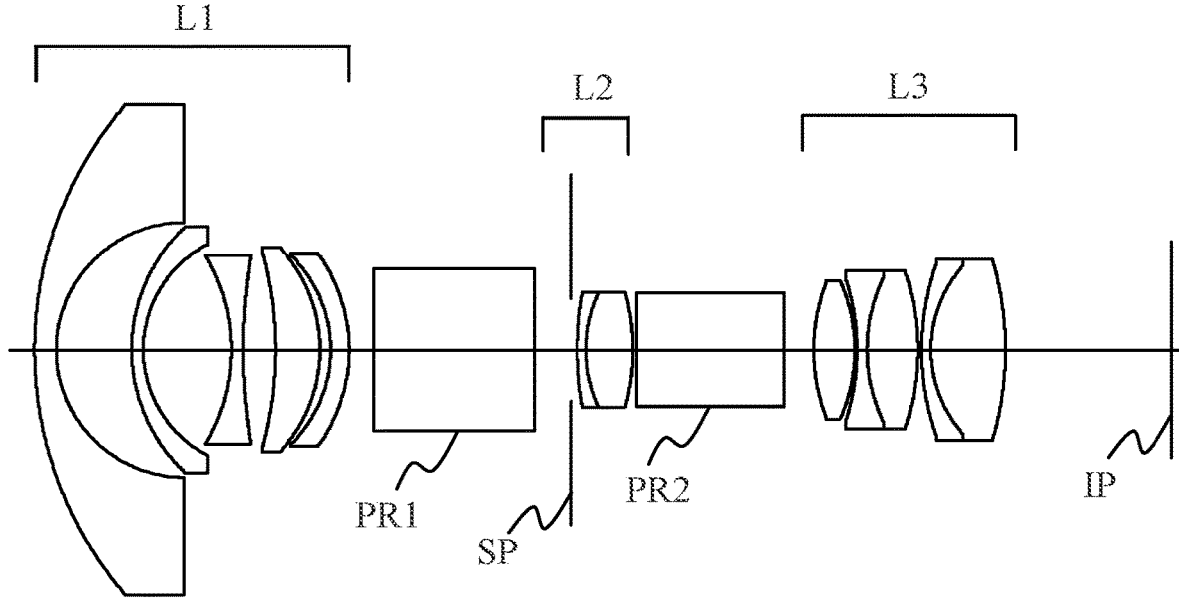
FIG. 5 is a sectional view of an optical system according to Example 3.
Figure 6:
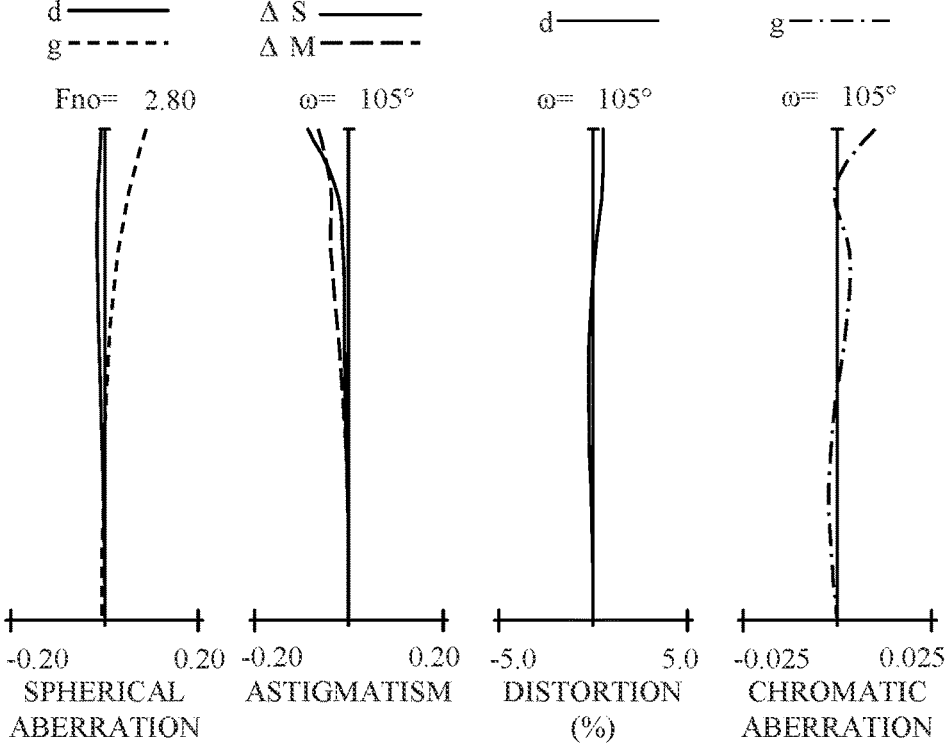
FIG. 6 is an aberration diagram of the optical system focusing on an object at an infinite distance according to Example 3.
Figure 7:
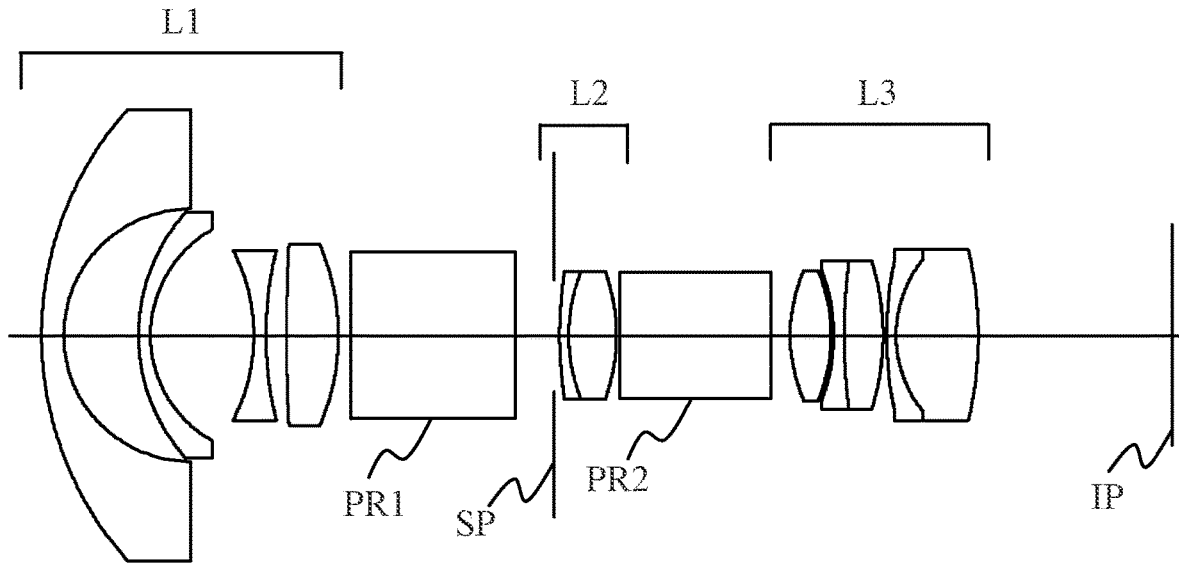
FIG. 7 is a sectional view of an optical system according to Example 4.
Figure 8:
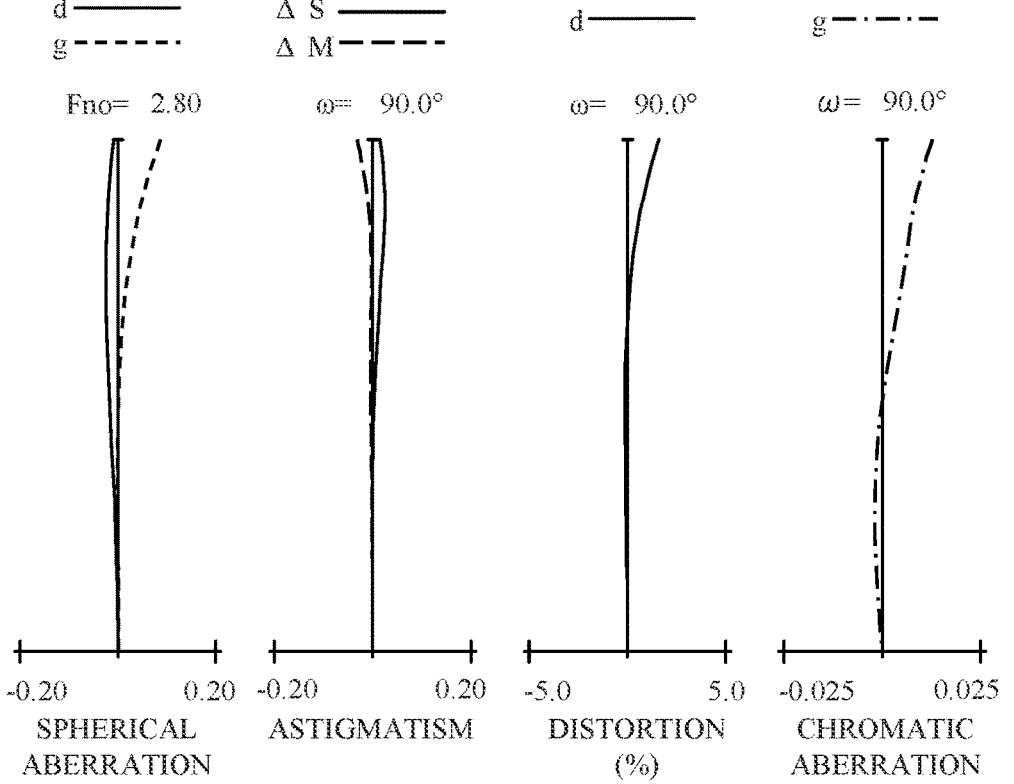
FIG. 8 is an aberration diagram of the optical system focusing on an object at an infinite distance according to Example 4.
Figure 9:
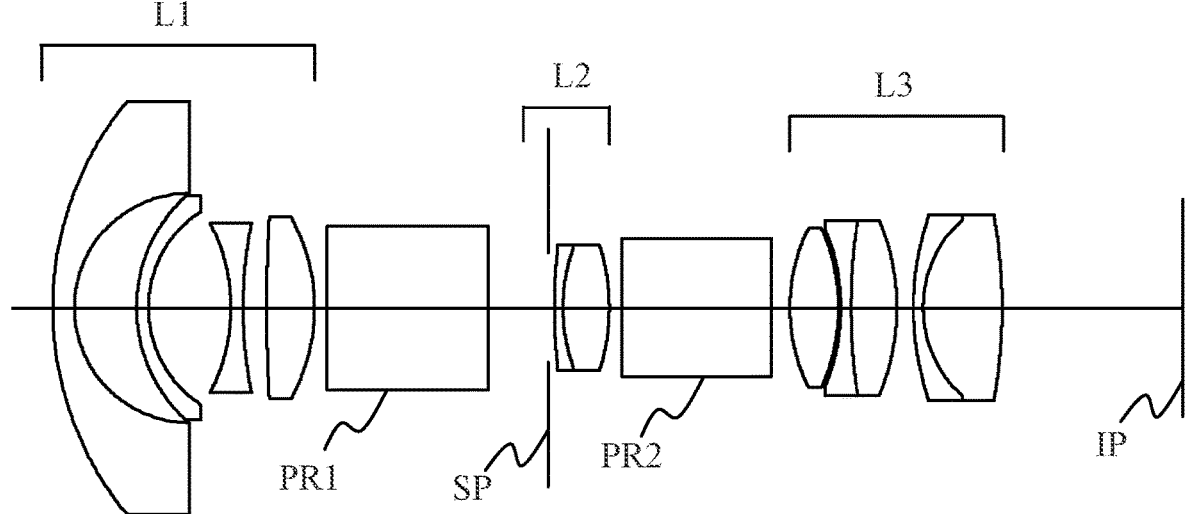
FIG. 9 is a sectional view of an optical system according to Example 5.
Figure 10:
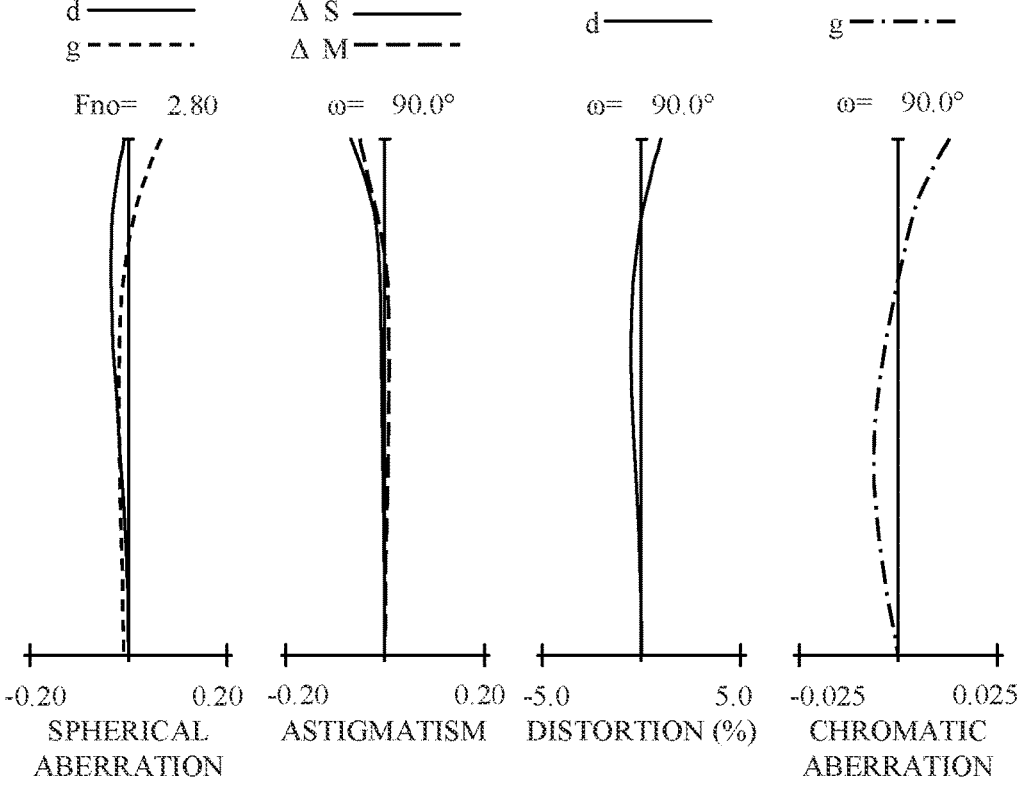
FIG. 10 is an aberration diagram of the optical system focusing on an object at an infinite distance according to Example 5.
Figure 11:
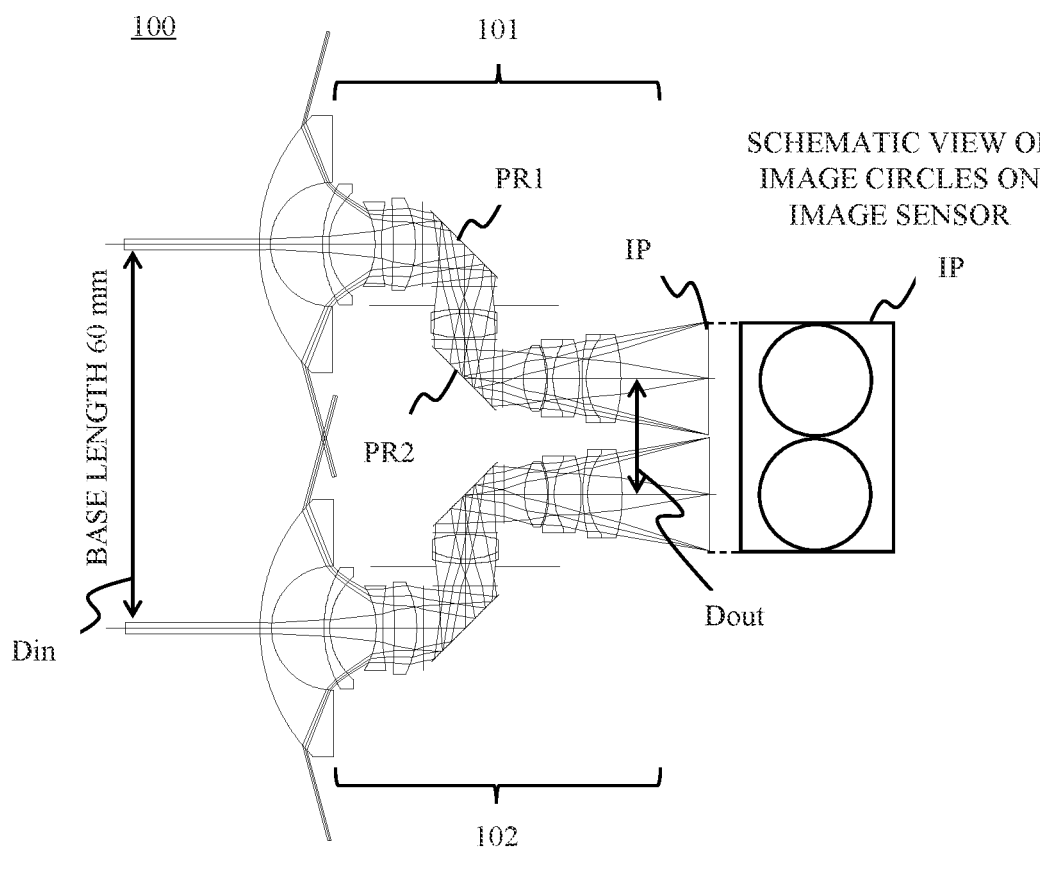
FIG. 11 is a sectional view of a main part of a lens apparatus including two optical systems according to Example 1, and illustrates a state in which optical paths are bent by reflective members.

FIG. 11 illustrates a lens apparatus 100 in which two optical systems according to Example 1 (first optical system 101 and second optical system 102) are arranged in parallel, and illustrates a state in which incident light rays are bent by reflective prisms and image circles of the two optical systems are imaged by one image sensor. The two optical systems are held by an unillustrated housing. FIG. 11 illustrates that, as an example, two optical systems according to Example 1 are disposed, but two optical systems according to the other Examples may be disposed.

The optical system according to each example is an optical system used in an image pickup apparatus that can acquire a stereoscopic captured image of an object with a wide angle of view of panorama imaging or the like.

In each lens sectional view, a left side is an object side (front side) and a right side is an image side (rear side). The optical system according to each example includes a plurality of lens units. A lens unit may consist of a single lens or may include a plurality of lenses. A lens unit may include an aperture diaphragm.

In each lens sectional view, Li represents an i-th lens unit (i is a natural number) counted from the object side. SP represents an aperture diaphragm. IP represents an image plane. In a case where the optical system according to each example is used as an image pickup optical system for a digital still camera or a digital video camera, an imaging plane of a solid-state image sensor (photoelectric conversion element) such as a CCD sensor and a CMOS sensor is disposed as the image plane IP. In a case where the optical system according to each example is used as an image pickup optical system for a silver-halide film camera, a photosensitive surface corresponding to a film surface is disposed as the image plane IP. The optical system according to each example may include an unillustrated optical block that corresponds to an optical filter, a face plate, a low-pass filter, an infrared cut filter, or the like and is disposed on the object of the image plane IP. PR1 and PR2 represent prisms.

In each spherical aberration diagram, Fno represents an F-number, and each spherical aberration diagram indicates spherical aberration amounts at a d-line (wavelength 587.6 nm) and at a g-line (wavelength 435.8 nm). In each astigmatism diagram, ΔS represents an astigmatism amount on a sagittal image plane, and ΔM represents an astigmatism amount on a meridional image plane. Each distortion diagram indicates a distortion amount at the d-line. Each chromatic aberration diagram indicates a chromatic aberration amount at the d-line. ω represents an imaging half angle of view (°).

In a case where a captured image is to be viewed while being displayed on a head mounted display etc., the captured image may be captured with a distance (base length) between optical axes on an incident side of the two optical systems set to a distance between human's eyes so that an experience of a realistic stereoscopic image is provided. Generally, the distance between the human's eyes is about 60 to 65 mm. The more greatly the base length is different from the distance between the human's eyes, the greater the deviation between the provided experience and a stereoscopic sensation when a human actually views the scene or a stereoscopic sensation based on the human's experience and the more likely discomfort is caused. In a case where the base length is too short, the left and right optical systems do not provide parallax, and a stereoscopic effect cannot be provided when the captured image is viewed. On the other hand, in a case where the base length is too long, parallax becomes too strong, and when the captured image is viewed, the stereoscopic effect is emphasized and a user is likely to feel tired.

The optical system according to each example is assumed to be used with an image sensor having a short side length of 24 mm and a long side length of 36 mm, which is generally used in a lens-interchangeable camera. In a case where the base length is set to 60 mm, since the long side length of the image sensor is 36 mm, if normal fish-eye lenses not including a reflective member are arranged in parallel, image circles of the optical systems are not included in the image sensor, which causes vignetting of an angle of view. Therefore, as illustrated in FIG. 11, the optical system according to each example includes two reflective prisms so that the image circles of the two optical systems are included in one image sensor.

Since the long side length of the image sensor is 36 mm, one optical system can use a length of 18 mm in a long side direction of the image sensor. An image circle of the optical system according to each example is set to 17.5 mm, and a distance of 1 mm is set between the image circles of the two optical systems. In this case, a distance (Dout) is 18.5 mm between surface vertexes of respective most image side lenses in the two optical systems (hereinafter, a lens disposed at a position closest to an image side in an optical system is referred to as "most image side lens" in the optical system). In the optical system according to each Examples 1 to 4, the base length is set to 60 mm, and thus a distance (Din) is 60 mm between surface vertexes of respective most object side lenses in the two optical systems (hereinafter, a lens disposed at a position closest to an object side in an optical system is referred to as "most object side lens" in the optical system). In the optical system according to Example 5, the base length is set to 65 mm, and thus a distance (Din) is 65 mm between surface vertexes of respective most object side lenses in the two optical systems. The image circle of each optical system is located so that each image circle is internally in contact with the short side of the image sensor. In each of Examples 1 to 4, in a case where the base length is set to 60 mm and a distance is set to 18.5 mm between surface vertexes of the respective most image side lenses in the two optical systems, a length on an optical axis between the two reflective surfaces of each optical system is 20.75 mm. In Example 5, in a case where the base length is set to 65 mm and the distance is set to 18.5 mm between the surface vertexes of the respective most image side lenses in the two optical systems, the length on the optical axis between the two reflective surfaces of each optical system is 23.25 mm. The optical system according to each example is assumed to be used with the image sensor having a short side length of 24 mm and a long side length of 36 mm, which is generally used for lens-interchangeable cameras, but is not limited to this, and can be applied to cameras including image sensors having various sizes. Further, the distance between the two image circles can be set arbitrarily.

The optical system according to each example uses an equiangle projection. The equiangle projection is defined by y=fω where y represents a half image height, ω represents a half angle of view, and f represents a focal length. There are various projection methods such as equisolid angle projection and three-dimensional projection, and which projection method to be used is arbitrary.

Next, a description is given of a characteristic configuration of the optical system according to each example.

The optical system according to each example includes, in order from the object side to the image side, a first lens unit L1 having a negative refractive power, a first reflective prism PR1, a second lens unit L2 having a positive refractive power and including an aperture diaphragm SP, a second reflective prism PR2, and a third lens unit L3 having a positive refractive power. Each optical system has, as a whole, a so-called retrofocus type refractive power arrangement that includes a front unit having a negative refractive power and a rear unit having a positive refractive power, which makes it possible to make the optical system small and wide angle.

In the optical system according to each example, the aperture diaphragm SP is disposed between reflective surfaces of two prisms. In order that the image circles of the two optical systems (first optical system 101 and second optical system 102) are imaged on one image sensor as illustrated in FIG. 11, it is necessary to dispose lenses in close proximity to each other on the image side of the second reflective prisms PR2. Therefore, if the aperture diaphragms SP are disposed on the object side of the first reflective prisms PR1, lens diameters of the lenses close to the image side increase, which may raise a problem of interference between adjacent lenses. If the aperture diaphragms SP are disposed on the image side of the second reflective prisms PR2, lens diameters of the lenses close to the object side increase, which may raise problems of increase in a weight and interference between adjacent lenses.

As described above, in a configuration where an optical system having a wide angle of view includes a prism and bends the light ray, a distribution of the angles of light rays incident on a reflective surface becomes wide and light rays from part of the angle of view are not totally reflected. In a case where the light rays from the part of angle of view are not totally reflected, the reflective surface has to be treated with deposition of metal such as silver and aluminum, which raises a problem of increase in a cost.

The angle of the light ray incident on the reflective surface of the first reflective prism PR1 is determined by the refractive power of the first lens unit L1. The reflective surface of the first reflective prism PR1 is tilted by 45° with respect to the optical axis. In order that the distribution of the incident angles on the reflective surface is reduced and a light ray at every image height is totally reflected, the refractive power of the first lens unit L1 may be strengthened so that an off-axis light ray having passed through the first lens unit L1 becomes parallel to the optical axis. However, if the refractive power of the first lens unit L1 becomes too strong, off-axis aberration such as field curvature and distortion greatly deteriorates. Further, the strong refractive power of the first lens unit L1 greatly spreads an on-axis light ray, which increases an effective diameter of the second reflective prism PR2 and the size of the second reflective prism PR2. The increase in the size of the prism causes an increase in a distance between the third lens unit L3 and the aperture diaphragm SP, which causes an increase in a size of a lens included in the third lens unit L3 and raises the problem of the interference between the adjacent lenses. Therefore, the refractive power of the first lens unit L1 has to be properly set. A total reflection angle of a prism reflective surface is determined by a refractive power of the prism. sin θ=Nb/Na specifies a total reflection angle θ in a case where light is transmitted from medium A (refractive index Na) to medium B (refractive index Nb). In a case of a prism, the higher the refractive index of the prism, the smaller the total reflection angle and the more easily the total reflection is caused. Therefore, based on the refractive index of the prism, the refractive power of the first lens unit L1 may be set to an optimum refractive power in a range where the light rays at all image heights are totally reflected. The optical system according to each example satisfies the following inequality (1), where f1 represents a focal length of the first lens unit L1, f represents a focal length of the entire optical system. Npr represents a refractive index of the first reflective prism PR1.

$$-1.27<(f1/f)/Npr<-0.70 \tag{1}$$

The inequality (1) is an inequality relating to the refractive index of the first lens unit L1 with respect to the refractive index of the first reflective prism PR1. If the value is smaller than the lower limit value of the inequality (1), the refractive power of the first lens unit L1 becomes too strong, which causes, as described above, the increase in the size of the lens included in the third lens unit L3 and raises the problem of the interference between the adjacent lenses. Further, a problem is raised of deterioration in the off-axis aberration that occurs in the first lens unit L1. If the value is larger than the upper limit value of the inequality (1), the refractive power of the first lens unit L1 becomes too weak, which raises problems that the light rays are not reflected at some image heights and that the size of the first lens unit L1 increases.

The numerical range of the inequality (1) may be set to a range of the following inequality (1a).

$$-1.26<(f1/f)/Npr<-0.75 \tag{1a}$$

The numerical range of the inequality (1) may be set to a range of the following inequality (1b).

$$-1.25<(f1/f)/Npr<-0.80 \tag{1b}$$

In the optical system according to each example, the second lens unit L2 having the positive refractive power is disposed between the first reflective prism PR1 and the second reflective prism PR2. The second lens unit L2 has an effect of causing the on-axis light ray to enter the second reflective prism PR2 by converging the on-axis light ray spread by the first lens unit L1 having the strong refractive power, and thereby reduces an increase in the size of the second reflective prism PR2. Further, the second lens unit L2 converges, to the optical axis side, the on-axis light ray having passed through the aperture diaphragm SP, and reduces increase in the size of the third lens unit L3. However, the base length required for stereoscopic imaging determines the distance of the space between the first reflective prism PR1 and the second reflective prism PR2 where the second lens unit L2 is disposed, and no large space is ensured there. Hence, the second lens unit L2 cannot include many lenses, and if the second lens unit L2 is set to have a strong refractive power, spherical aberration and optical aberration deteriorate, which decreases the optical performance. Therefore, it is necessary to optimally set a share of refractive powers between the second lens unit L2 and the third lens unit L3 having the positive refractive power. The third lens unit L3 is disposed at a position away from the aperture diaphragm SP and is likely to have a large lens diameter which is determined by the off-axis light ray. The third lens unit L3 having the positive refractive power provides effects of converging the off-axis light ray and reducing the increase in the lens outer diameter by itself. Thus, it is necessary to properly set the refractive power arrangement for the second lens unit L2 and the third lens unit L3 so that the lens included in the third lens unit L3 does not become large. The optical system according to each example satisfies the following inequality (2), where f2 represents a focal length of the second lens unit L2, and f3 represents a focal length of the third lens unit L3.

$$0.60 < f2/f3 < 1.60 \tag{2}$$

The inequality (2) is an inequality for properly setting the share of refractive powers between the second lens unit L2 and the third lens unit L3. If the value is smaller than the lower limit value of the inequality (2), the refractive power of the second lens unit L2 becomes too strong, which raises the problem of the deterioration in spherical aberration and comma as described above. If the value is larger than the upper limit value of the inequality (3), the size of the second reflective prism PR2 increases, and the size of the third lens unit L3 following it also increases as described above, which raises the problem of the interference between the adjacent lenses.

The numerical range of the inequality (2) may be set to a range of the following inequality (2a).

$$0.65 < f2/f3 < 1.50 \tag{2a}$$

The numerical range of the inequality (2) may be set to a range of the following inequality (2b).

$$0.72 < f2/f3 < 1.40 \tag{2b}$$

As described above, according to each example, it is possible to realize, with a low cost, a small-size and high-performance optical system capable of performing stereoscopic imaging in which one image sensor captures an image formed by each of two optical systems.

Next, a description is given of conditions and configurations that may be satisfied the optical system according to each example. The optical system according to each example may satisfy one or more of the following inequalities and configurations.

The optical system according to each example may satisfy the following inequality (3), where f2 represents the focal length of the second lens unit L2.

$$4.80 < f2/f < 10.50 \tag{3}$$

The inequality (3) is an inequality relating to the optical performance and a size reduction of the lens in the third lens unit L3. If the value is smaller than the lower limit value of the inequality (3), the refractive power of the second lens unit L2 becomes too large, which raises the problem of the deterioration in on-axis aberration such as spherical aberration and comma, as described above. If the value is larger than the upper limit value of the inequality (3), the third lens unit L3 becomes too large as described above, which raises problems such as the interference between the adjacent lenses.

The numerical range of the inequality (3) may be set to a range of the following inequality (3a).

$$5.00 < f2/f < 9.50 \tag{3a}$$

The numerical range of the inequality (3) may be set to a range of the following inequality (3b).

$$5.27 < f2/f < 8.50 \tag{3b}$$

In the optical system according to each example, the first lens unit L1 may include of two or more negative lenses and one or more positive lenses. As described above, the optical system according to each example includes two prisms. The first lens unit L1 having the negative refractive power and the third lens unit L3 having the positive refractive power are disposed at positions far from the aperture diaphragm SP, and a refractive power arrangement is asymmetric with respect to the aperture diaphragm SP. Therefore, since it is difficult for off-axis aberration generated in the third lens unit L3 to cancel off-axis aberration, such as lateral chromatic aberration and astigmatism, generated in the first lens unit L1, it is necessary to cause each lens unit to correct aberration. In particular, the first lens unit L1 has the strong negative refractive power so as to cause the first reflective prism PR1 to totally reflect the light ray at every image height. Thus, the first lens unit L1 may include at least two negative lenses so as to reduce the off-axis aberration caused by the negative lenses. In addition, the first lens unit L1 may include at least one positive lens so that the positive lens corrects the off-axis aberration caused by the negative lenses.

The optical system according to each example may satisfy the following inequality (4), where N1Aave represents an average value of refractive indexes at the d-line of negative lenses (or a refractive index at the d-line of a negative lens) included in the first lens unit L1 (an average refractive index at the d-line of a negative lens included in the first lens unit).

$$1.78 < N1Aave < 2.20 \tag{4}$$

The inequality (4) is an inequality relating to optical performance. As described above, the first lens unit L1 has the strong negative refractive power so as to cause the first reflective prism PR1 to totally reflect the light ray at every image height. Hence, the first lens unit L1 is likely to cause off-axis aberration such as astigmatism and field curvature. If high image quality is to be realized, the negative lens included in the first lens unit L1 may be made of a glass material having a high refractive index. If the value is smaller than the lower limit value of the inequality (4), the refractive index of the negative lens of the first lens unit L1 is too low, which deteriorates off-axis aberration. If the value is larger than the upper limit value of the inequality (4), workability of the lens lowers, which raises a problem of an increase in the cost.

The numerical range of the inequality (4) may be set to a range of the following inequality (4a).

$$1.80 < N1Aave < 2.10 \tag{4a}$$

The numerical range of the inequality (4) may be set to a range of the following inequality (4b).

$$1.82 < N1Aave < 2.05 \tag{4b}$$

The optical system according to each example may satisfy the following inequality (5), where N1p represents a refractive index at the d-line of a positive lens having the largest refractive power in positive lenses (or a positive lens) included in the first lens unit L1 (a refractive index at the d-line of a positive lens having the largest positive refractive power in the first lens unit L1).

$$1.78 < N1p < 2.20 \tag{5}$$

The inequality (5) is an inequality relating to the optical performance. As described above, the first lens unit L1 includes the positive lens so as to correct the off-axis aberration caused by the first lens unit L1 having the strong refractive power. However, if the first lens unit L1 includes many positive lenses, the first lens unit L1 becomes large. Therefore, it is necessary to correct aberration with a small number of positive lenses, and the positive lens may be made of a material having a high refractive index. If the value is smaller than the lower limit value of the inequality (5), the refractive index of the positive lens becomes too low, which makes it difficult to correct the off-axis aberration caused by the negative lens with a small number of positive lens(es). If the value is larger than the upper limit value of the inequality (5), workability of the lens lowers, which raises a problem such as an increase in the cost.

The numerical range of the inequality (5) may be set to a range of the following inequality (5a).

$$1.79 < N1p < 2.10 \tag{5a}$$

The numerical range of the inequality (5) may be set to a range of the following inequality (5b).

$$1.80 < N1p < 2.05 \tag{5b}$$

The optical system according to each example may satisfy the following inequality (6), where LP represents a distance on the optical axis between the reflective surfaces of the first reflective prism PR1 and the second reflective prism PR2.

$$1.00 < f2/LP < 2.40 \tag{6}$$

The inequality (6) is an inequality relating to ensuring of the base length and to interference between adjacent lenses. As described above, the second lens unit L2 is configured so that the size of the second reflective prism PR2 is reduced, and thereby the size of the third lens unit is reduced and the interference between the adjacent lens units are prevented. The base length is determined by the distance on the optical axis between the reflective surfaces of the first reflective prism PR1 and the second reflective prism PR2. In order that a natural stereoscopic image is captured, the base length needs to be set to about the distance between the human's eyes and thus is limited. Since the aperture diaphragm SP is also disposed between the first reflective prism PR1 and the second reflective prism PR2, many lenses cannot be disposed there. Therefore, it is important to properly set the refractive power of the second lens unit L2. If the value is smaller than the lower limit value of the inequality (6), the refractive power of the second lens unit L2 becomes too strong. Since many lenses for correcting comma and spherical aberration cannot be disposed, the optical performance deteriorates. If the value is larger than the upper limit value of the inequality (6), the third lens unit L3 becomes large, which causes the problem of the interference between the adjacent lenses.

The numerical range of the inequality (6) may be set to a range of the following inequality (6a).

$$1.10 < f2/LP < 2.20 \tag{6a}$$

The numerical range of the inequality (6) may be set to a range of the following inequality (6b).

$$1.20 < f2/LP < 2.00 \tag{6b}$$

The optical system according to each example may satisfy the following inequality (7).

$$1.00 < f3/LP < 2.20 \tag{7}$$

As described above, the second lens unit L2 has the effect of reducing the size of the third lens unit L3. However, since the base length determines the distance between the first reflective prism PR1 and the second reflective prism PR2, the interference between the adjacent lenses cannot be avoided only by the second lens unit L2. Hence, it is necessary to properly set the refractive power of the third lens unit L3. If the value is smaller than the lower limit value of the inequality (7), the refractive power of the third lens unit becomes too strong, which greatly causes comma and astigmatism. If the value is larger than the upper limit value of the inequality (7), the interference between the adjacent lenses occurs.

The numerical range of the inequality (7) may be set to a range of the following inequality (7a).

$$1.10 < f3/LP < 2.00 \tag{7a}$$

The numerical range of the inequality (7) may be set to a range of the following inequality (7b).

$$1.20 < f3/LP < 1.75 \tag{7b}$$

The optical system according to each example may satisfy the following inequality (8).

$$1.78 < Npr < 2.20 \tag{8}$$

The inequality (8) is an inequality relating to the refractive index of the first reflective prism PR1 and is for totally reflecting the light rays from the entire angle of view. If the value is smaller than the lower limit value of the inequality (8), the total reflection angle of the reflective surface becomes small, and thus the refractive power of the first lens unit L1 needs to be increased as described above, which raises the problem of deterioration in off-axis aberration such as astigmatism and field curvature. If the value is larger than the upper limit value of the inequality (8), a thickness of glass of the prism becomes large, which greatly reduces transmittance. In addition, workability deteriorates and the cost increases.

The numerical range of the inequality (8) may be set to a range of the following inequality (8a).

$$1.79 < Npr < 2.10 \tag{8a}$$

The numerical range of the inequality (8) may be set to a range of the following inequality (8b).

$$1.79 < Npr < 2.05 \tag{8b}$$

The optical system according to each example may satisfy the following inequality (9) in a state where two optical systems are arranged in parallel as illustrated in FIG. 11. Din represents a distance between the surface vertexes of the respective most object side lenses in the two optical systems, and Dout represents a distance between the surface vertexes of the respective most image side lenses in the two optical systems.

$$0.05 < Dout/Din < 0.5 \tag{9}$$

The inequality (9) is an inequality relating to a stereoscopic effect and discomfort when a captured image is viewed. If the value is smaller than the lower limit value of the inequality (9), since the base length is much longer than the distance between the human's eyes, parallax becomes too large and the user is likely to feel tired. If the value is larger than the upper limit value of the inequality (9), parallax of a captured image becomes insufficient, and the stereoscopic effect cannot be provided.

The numerical range of the inequality (9) may be set to a range of the following inequality (9a).

$$0.10 < Dout/Din < 0.45 \tag{9a}$$

The numerical range of the inequality (9) may be set to a range of the following inequality (9b).

$$0.15 < Dout/Din < 0.40 \tag{9b}$$

The optical system according to each example may satisfy the following inequality (10) where ω represents a half angle of view (°) of the optical system according to each example.

$$85.0° < \omega < 120.00 \tag{10}$$

If the value is smaller than the lower limit value of the inequality (10), the angle of view is insufficient when a captured image is viewed, and a sufficient sense of presence cannot be provided. If the value is larger than the upper limit value of the inequality (10), the number of pixels per the angle of view on the image sensor decreases, and resolution when a captured image is viewed becomes insufficient.

The numerical range of the inequality (10) may be set to a range of the following inequality (10a).

$$87.00 < \omega < 115.00 \tag{10a}$$

The numerical range of the inequality (10) may be set to a range of the following inequality (10b).

$$89.0° < \omega < 110.0° \tag{10b}$$

Next, a description is given of a configuration of each lens unit in the optical system according to each example.

In each of Examples 1, 2, 4 and 5, the first lens unit L1 includes, in order from the object side to the image side, a negative meniscus lens having a convex surface on the object side, a negative meniscus lens having a convex surface on the object side, a biconcave lens, and a positive lens. In Example 3, the first lens unit L includes, in order from an object side to an image side, a negative meniscus lens having a convex surface on the object side, a negative meniscus lens having a convex surface on the object side, a biconcave lens, a positive lens having a convex surface on the image side, and a negative meniscus lens having a convex surface on the image side. A surface closest to the image plane of the first lens unit L1 is an aspherical surface and corrects off-axis aberration such as astigmatism.

In each of Examples 1 to 5, the second lens unit L2 includes, in order from the object side to the image side, an aperture diaphragm SP, and a cemented lens of a meniscus lens having a convex surface on the object side and a biconvex lens.

In each of Examples 1, 3, 4, and 5, the third lens unit L3 includes, in order from the object side to the image side, a biconvex lens, a cemented lens of a biconcave lens and a biconvex lens, and a cemented lens of a negative meniscus lens having a convex surface on the object side and a biconvex lens. In Example 2, the third lens unit L3 includes, in order from the object side to the image side, a biconvex lens, a cemented lens of a negative meniscus lens having a convex surface on the image side and a positive meniscus lens having a convex surface on the image side, and a cemented lens of a negative meniscus lens having a convex surface on the object side and a biconvex lens.

In the optical system according to each example, the first reflective prism PR1 is disposed between the first lens unit L1 and the second lens unit L2, and the second reflective prism PR2 is disposed between the second lens unit L2 and the third lens unit L3.

Numerical Examples 1 to 5 respectively corresponding to Examples 1 to 5 are given below.

In surface data of each numerical example, r represents a curvature radius of each optical surface, and d (mm) represents an on-axis distance, i.e., a distance on an optical axis, between an m-th surface and an (m+1)-th surface. m is the number of the surface counted from a light incident side. nd represents a refractive index at the d-line of each optical member, and vd represents an abbe number of each optical member. An abbe number vd of a certain material is expressed by the following equation, where Nd, NF, and NC represent refractive indexes at the d-line (587.6 nm), F-line (486.1 nm), and C-line (656.3 nm) of Fraunhofer lines.

$$vd = (Nd-1)/(NF-NC)$$

In each numerical example, d, a focal length (mm), an F-number, and a half angle of view (°) are values in a state where the optical system according to each example focuses on an object at an infinite distance. "Back focus" represents an air conversion length of a distance on the optical axis from a last lens surface (lens surface closest to the image side) to a paraxial image plane. "Overall lens length" represents a length acquired by adding the back focus to a distance on the optical axis from a front lens surface (lens surface closest to the object side) of the optical system to the last lens surface of the optical system. "Lens unit" is not limited to a lens unit including a plurality of lenses and may consist of a single lens.

A reflective member according to each of Numerical Examples 1 to 5 is described as one block member. Actually, the reflective members of each lens are arranged so that the light ray is bent by 45° with respect to the center of the block member. Each of Numerical Examples 1 to 5 uses a method in which the entire optical system is extended in focusing from an object at an infinite distance to an object at a short distance. However, focusing may be performed by driving part of lenses of the optical system in order that a weight of a driving unit is decreased.

If an optical surface is an aspherical surface, a sign * is attached to a right side of the surface number. An aspherical surface shape is expressed by the following equation where X represents a displacement amount in an optical axis direction from a surface vertex, h represents a height in a direction orthogonal to the optical axis from the optical axis, R represents a paraxial curvature radius, k represents a conic constant, and A4, A6, A8, and A10 represent aspherical surface coefficients of respective orders.

$$X = (h^2/R)/[1+\{1-(1+k)h/R)^2\}^{1/2} + A4 \times h^4 + A6 \times h^b + A8 \times h^8 + A10 \times h^{10}]$$

"e±XX" in each aspherical surface coefficient represent "$\times 10^{\pm XX}$".

Numerical Example 1

Unit: mm

| SURFACE DATA | | | | | |
|---|---|---|---|---|---|
| Surface Number | r | d | nd | vd | Effective Diameter |
| 1 | 28.343 | 1.75 | 2.00100 | 29.1 | 38.52 |
| 2 | 9.613 | 8.11 | | | 19.23 |
| 3 | 18.666 | 0.95 | 1.95375 | 32.3 | 17.58 |
| 4 | 10.629 | 7.18 | | | 14.89 |
| 5 | −12.328 | 0.95 | 1.88300 | 40.8 | 11.95 |
| 6 | 41.971 | 1.81 | | | 12.16 |
| 7 | −92.352 | 3.50 | 2.00069 | 25.5 | 12.63 |
| 8 | −15.446 | 1.00 | | | 13.23 |
| 9 | ∞ | 13.00 | 1.88300 | 40.8 | 12.18 |
| 10 | ∞ | 3.00 | | | 9.29 |

-continued

| | | | | | |
|---|---|---|---|---|---|
| 11 (Diaphragm) | ∞ | 0.50 | | | 9.16 |
| 12 | 23.042 | 0.70 | 1.90043 | 37.4 | 9.39 |
| 13 | 12.054 | 3.80 | 1.54072 | 47.2 | 9.31 |
| 14 | −17.283 | 0.25 | | | 9.54 |
| 15 | ∞ | 12.00 | 1.88300 | 40.8 | 9.40 |
| 16 | ∞ | 3.10 | | | 8.44 |
| 17 | 10.000 | 3.59 | 1.43875 | 94.7 | 9.39 |
| 18 | −12.548 | 0.20 | | | 9.45 |
| 19 | −13.486 | 0.85 | 1.83481 | 42.7 | 9.35 |
| 20 | 10.509 | 4.12 | 1.49700 | 81.5 | 9.84 |
| 21 | −18.811 | 0.30 | | | 10.85 |
| 22 | 26.600 | 0.75 | 1.90043 | 37.4 | 11.58 |
| 23 | 10.300 | 5.33 | 1.49700 | 81.5 | 11.58 |
| 24 | −24.585 | 13.51 | | | 12.67 |
| Image Plane | ∞ | | | | |

VARIOUS DATA

| | |
|---|---|
| Focal Length: | 4.77 |
| F-Number: | 2.80 |
| Half Angle of View (°): | 105.00 |
| Image Height: | 8.75 |
| Overall Lens Length: | 90.26 |
| BF: | 13.51 |
| Position of Entrance Pupil: | 9.71 |
| Position of Exit Pupil: | −48.26 |
| Front Principal Position: | 14.11 |
| Rear Principal Position: | 8.74 |

ZOOM LENS UNIT DATA

| Unit | Starting Surface | Last Surface | Focal Length | Lens Structure Length | Front Principal Position | Rear Principal Position |
|---|---|---|---|---|---|---|
| L1 | 1 | 8 | −7.50 | 24.25 | 3.63 | −21.16 |
| L2 | 11 | 14 | 25.15 | 5.00 | 2.48 | −0.96 |
| L3 | 17 | 24 | 34.56 | 15.15 | 5.52 | −6.30 |

SINGLE LENS DATA

| Lens | Starting Surface | Focal Length |
|---|---|---|
| 1 | 1 | −15.25 |
| 2 | 3 | −27.47 |
| 3 | 5 | −10.70 |
| 4 | 7 | 18.12 |
| 5 | 9 | 0.00 |
| 6 | 12 | −28.94 |
| 7 | 13 | 13.76 |
| 8 | 15 | 0.00 |
| 9 | 17 | 13.33 |
| 10 | 19 | −6.96 |
| 11 | 20 | 14.23 |
| 12 | 22 | −19.08 |
| 13 | 23 | 15.39 |

Numerical Example 2

Unit: mm

SURFACE DATA

| Surface Number | r | d | nd | vd | Effective Diameter |
|---|---|---|---|---|---|
| 1 | 30.662 | 1.75 | 2.00100 | 29.1 | 37.36 |
| 2 | 10.632 | 6.34 | | | 20.97 |
| 3 | 15.903 | 0.95 | 1.95375 | 32.3 | 19.50 |

-continued

| | | | | | |
|---|---|---|---|---|---|
| 4 | 10.310 | 7.56 | | | 16.54 |
| 5 | −14.405 | 0.95 | 1.88300 | 40.8 | 15.33 |
| 6 | 63.419 | 1.71 | | | 15.98 |
| 7 | −684.604 | 3.97 | 2.00069 | 25.5 | 16.66 |
| 8 | −17.774 | 6.90 | | | 17.20 |
| 9 | ∞ | 13.00 | 1.80400 | 46.6 | 12.20 |
| 10 | ∞ | 3.00 | | | 8.35 |
| 11 (Diaphragm) | ∞ | 0.50 | | | 8.81 |
| 12 | 54.465 | 0.70 | 1.90043 | 37.4 | 8.93 |
| 13 | 16.308 | 3.80 | 1.54072 | 47.2 | 8.94 |
| 14 | −18.168 | 0.25 | | | 9.31 |
| 15 | ∞ | 12.00 | 1.80400 | 46.6 | 9.25 |
| 16 | ∞ | 1.50 | | | 8.84 |
| 17 | 12.316 | 3.70 | 1.43875 | 94.7 | 10.49 |
| 18 | −14.278 | 0.20 | | | 10.63 |
| 19 | −14.474 | 0.85 | 1.83481 | 42.7 | 10.58 |
| 20 | −52.284 | 2.50 | 1.49700 | 81.5 | 10.95 |
| 21 | −24.541 | 2.23 | | | 11.47 |
| 22 | 30.550 | 0.75 | 1.90043 | 37.4 | 11.91 |
| 23 | 8.684 | 6.50 | 1.49700 | 81.5 | 11.62 |
| 24 | −29.335 | 13.80 | | | 12.90 |
| Image Plane | ∞ | | | | |

VARIOUS DATA

| | |
|---|---|
| Focal Length: | 5.23 |
| F-Number: | 2.80 |
| Half Angle of View (°): | 95.00 |
| Image Height: | 8.75 |
| Overall Lens Length: | 95.41 |
| BF: | 13.80 |
| Position of Entrance Pupil: | 10.51 |
| Position of Exit Pupil: | −42.54 |
| Front Principal Position: | 15.25 |
| Rear Principal Position: | 8.57 |

ZOOM LENS UNIT DATA

| Unit | Starting Surface | Last Surface | Focal Length | Lens Structure Length | Front Principal Position | Rear Principal Position |
|---|---|---|---|---|---|---|
| L1 | 1 | 8 | −11.68 | 23.23 | 1.33 | −25.58 |
| L2 | 11 | 14 | 40.67 | 5.00 | 3.63 | 0.29 |
| L3 | 17 | 24 | 29.39 | 16.73 | 3.36 | −9.98 |

SINGLE LENS DATA

| Lens | Starting Surface | Focal Length |
|---|---|---|
| 1 | 1 | −17.00 |
| 2 | 3 | −33.52 |
| 3 | 5 | −13.22 |
| 4 | 7 | 18.18 |
| 5 | 9 | 0.00 |
| 6 | 12 | −26.08 |
| 7 | 13 | 16.53 |
| 8 | 15 | 0.00 |
| 9 | 17 | 15.74 |
| 10 | 19 | −24.22 |
| 11 | 20 | 90.36 |
| 12 | 22 | −13.70 |
| 13 | 23 | 14.29 |

Numerical Example 3

Unit: mm

| SURFACE DATA | | | | | |
|---|---|---|---|---|---|
| Surface Number | r | d | nd | vd | Effective Diameter |
| 1 | 30.693 | 1.75 | 2.00100 | 29.1 | 38.50 |
| 2 | 10.349 | 6.11 | | | 20.53 |
| 3 | 13.633 | 0.95 | 1.95375 | 32.3 | 18.75 |
| 4 | 9.700 | 7.11 | | | 15.93 |
| 5 | −14.738 | 0.95 | 1.88300 | 40.8 | 14.32 |
| 6 | 46.991 | 2.60 | | | 14.35 |
| 7 | −30.443 | 3.65 | 2.00069 | 25.5 | 14.69 |
| 8 | −12.138 | 0.87 | | | 15.40 |
| 9 | −10.704 | 1.50 | 1.58313 | 59.4 | 14.32 |
| 10* | −13.292 | 2.00 | | | 14.65 |
| 11 | ∞ | 13.00 | 2.00100 | 29.1 | 12.20 |
| 12 | ∞ | 3.00 | | | 8.51 |
| 13 (Diaphragm) | ∞ | 0.50 | | | 8.33 |
| 14 | 25.744 | 0.70 | 1.90043 | 37.4 | 8.48 |
| 15 | 10.952 | 3.80 | 1.54072 | 47.2 | 8.39 |
| 16 | −17.073 | 0.25 | | | 8.65 |
| 17 | ∞ | 12.00 | 2.00100 | 29.1 | 8.55 |
| 18 | ∞ | 2.40 | | | 8.00 |
| 19 | 15.444 | 3.33 | 1.43875 | 94.7 | 9.99 |
| 20 | −13.632 | 0.20 | | | 10.26 |
| 21 | −17.826 | 0.85 | 1.83481 | 42.7 | 10.22 |
| 22 | 13.680 | 4.08 | 1.49700 | 81.5 | 10.82 |
| 23 | −20.838 | 0.30 | | | 11.86 |
| 24 | 21.402 | 0.75 | 1.90043 | 37.4 | 12.83 |
| 25 | 10.309 | 6.04 | 1.49700 | 81.5 | 12.68 |
| 26 | −26.154 | 13.51 | | | 13.72 |
| Image Plane | ∞ | | | | |

ASPHERICAL SURFACE DATA
10th Surface

K = 0.00000e+000 A 4 = 1.30637e−005 A 6 = −1.61010e−007 A 8 = 1.57831e−009
A10 = −2.84708e−011

| VARIOUS DATA | |
|---|---|
| Focal Length: | 4.75 |
| F-Number: | 2.80 |
| Half Angle of View (°): | 105.00 |
| Image Height: | 8.75 |
| Overall Lens Length: | 92.20 |
| BF: | 13.51 |
| Position of Entrance Pupil: | 9.99 |
| Position of Exit Pupil: | −61.11 |
| Front Principal Position: | 14.44 |
| Rear Principal Position: | 8.76 |

| ZOOM LENS UNIT DATA | | | | | | |
|---|---|---|---|---|---|---|
| Unit | Starting Surface | Last Surface | Focal Length | Lens Structure Length | Front Principal Position | Rear Principal Position |
| L1 | 1 | 10 | −10.67 | 25.49 | 1.52 | −29.45 |
| L2 | 13 | 16 | 29.75 | 5.00 | 2.84 | −0.57 |
| L3 | 19 | 26 | 29.06 | 15.55 | 6.81 | −4.80 |

| SINGLE LENS DATA | | |
|---|---|---|
| Lens | Starting Surface | Focal Length |
| 1 | 1 | −16.30 |
| 2 | 3 | −39.96 |
| 3 | 5 | −12.61 |
| 4 | 7 | 18.34 |
| 5 | 9 | −119.83 |
| 6 | 11 | 0.00 |
| 7 | 14 | −21.66 |
| 8 | 15 | 12.96 |
| 9 | 17 | 0.00 |

-continued

| 10 | 19 | 17.10 |
|----|----|-------|
| 11 | 21 | −9.16 |
| 12 | 22 | 17.29 |
| 13 | 24 | −22.82 |
| 14 | 25 | 15.74 |

Numerical Example 4

Unit: mm

SURFACE DATA

| Surface Number | r | d | nd | vd | Effective Diameter |
|---|---|---|---|---|---|
| 1 | 26.962 | 1.75 | 2.00100 | 29.1 | 34.49 |
| 2 | 10.032 | 5.92 | | | 19.78 |
| 3 | 14.571 | 0.95 | 1.95375 | 32.3 | 18.31 |
| 4 | 9.653 | 8.18 | | | 15.52 |
| 5 | −14.766 | 0.95 | 1.88300 | 40.8 | 12.50 |
| 6 | 28.464 | 1.69 | | | 12.50 |
| 7 | 134.987 | 4.09 | 2.00069 | 25.5 | 12.98 |
| 8 | −18.112 | 1.00 | | | 13.40 |
| 9 | ∞ | 13.00 | 1.80400 | 46.6 | 12.20 |
| 10 | ∞ | 3.00 | | | 8.52 |
| 11 (Diaphragm) | ∞ | 0.50 | | | 8.85 |
| 12 | 36.531 | 0.70 | 1.90043 | 37.4 | 9.01 |
| 13 | 13.128 | 3.80 | 1.54072 | 47.2 | 8.99 |
| 14 | −15.722 | 0.25 | | | 9.34 |
| 15 | ∞ | 12.00 | 1.80400 | 46.6 | 9.25 |
| 16 | ∞ | 1.50 | | | 8.59 |
| 17 | 12.789 | 3.23 | 1.43875 | 94.7 | 9.31 |
| 18 | −13.722 | 0.20 | | | 9.54 |
| 19 | −14.620 | 0.85 | 1.83481 | 42.7 | 9.52 |
| 20 | 46.520 | 3.11 | 1.49700 | 81.5 | 10.01 |
| 21 | −19.985 | 0.30 | | | 10.78 |
| 22 | 30.290 | 0.75 | 1.90043 | 37.4 | 11.20 |
| 23 | 9.710 | 6.50 | 1.49700 | 81.5 | 11.13 |
| 24 | −28.547 | 15.35 | | | 12.56 |
| Image Plane | ∞ | | | | |

VARIOUS DATA

| | |
|---|---|
| Focal Length: | 5.52 |
| F-Number: | 2.80 |
| Half Angle of View (°): | 90.00 |
| Image Height: | 8.75 |
| Overall Lens Length: | 89.57 |
| BF: | 15.35 |
| Position of Entrance Pupil: | 10.11 |
| Position of Exit Pupil: | −41.89 |
| Front Principal Position: | 15.09 |
| Rear Principal Position: | 9.83 |

ZOOM LENS UNIT DATA

| Unit | Starting Surface | Last Surface | Focal Length | Lens Structure Length | Front Principal Position | Rear Principal Position |
|---|---|---|---|---|---|---|
| L1 | 1 | 8 | −10.49 | 23.53 | 2.00 | −24.50 |
| L2 | 11 | 14 | 31.46 | 5.00 | 3.28 | −0.09 |
| L3 | 17 | 24 | 31.64 | 14.94 | 4.50 | −6.76 |

SINGLE LENS DATA

| Lens | Starting Surface | Focal Length |
|---|---|---|
| 1 | 1 | −16.83 |
| 2 | 3 | −33.11 |
| 3 | 5 | −10.90 |
| 4 | 7 | 16.17 |
| 5 | 9 | 0.00 |
| 6 | 12 | −23.09 |

-continued

| 7 | 13 | 13.87 |
|---|----|-------|
| 8 | 15 | 0.00 |
| 9 | 17 | 15.67 |
| 10 | 19 | −13.24 |
| 11 | 20 | 28.57 |
| 12 | 22 | −16.15 |
| 13 | 23 | 15.45 |

Numerical Example 5

Unit: mm

SURFACE DATA

| Surface Number | r | d | nd | vd | Effective Diameter |
|---|---|---|---|---|---|
| 1 | 26.206 | 1.75 | 2.00100 | 29.1 | 31.96 |
| 2 | 9.259 | 5.00 | | | 18.19 |
| 3 | 12.311 | 0.95 | 2.00100 | 29.1 | 16.82 |
| 4 | 9.324 | 6.64 | | | 14.68 |
| 5 | −14.733 | 0.95 | 1.95375 | 32.3 | 12.71 |
| 6 | 33.722 | 1.95 | | | 12.74 |
| 7 | 137.773 | 3.88 | 1.80810 | 22.8 | 13.33 |
| 8 | −15.142 | 1.00 | | | 13.69 |
| 9 | ∞ | 13.00 | 1.80400 | 46.6 | 12.21 |
| 10 | ∞ | 4.75 | | | 8.27 |
| 11 (Diaphragm) | ∞ | 0.50 | | | 8.85 |
| 12 | 41.415 | 0.70 | 1.90043 | 37.4 | 9.00 |
| 13 | 13.820 | 3.80 | 1.54072 | 47.2 | 9.00 |
| 14 | −16.280 | 1.00 | | | 9.38 |
| 15 | ∞ | 12.00 | 1.80400 | 46.6 | 9.26 |
| 16 | ∞ | 1.50 | | | 10.08 |
| 17 | 14.453 | 3.90 | 1.43875 | 94.7 | 11.73 |
| 18 | −15.731 | 0.20 | | | 11.88 |
| 19 | −16.263 | 0.85 | 1.83481 | 42.7 | 11.83 |
| 20 | 49.982 | 3.70 | 1.49700 | 81.5 | 12.38 |
| 21 | −18.284 | 1.36 | | | 13.13 |
| 22 | 23.655 | 0.75 | 1.90043 | 37.4 | 13.68 |
| 23 | 9.552 | 6.35 | 1.49700 | 81.5 | 13.19 |
| 24 | −42.522 | 14.83 | | | 14.01 |
| Image Plane | ∞ | | | | |

VARIOUS DATA

| | |
|---|---|
| Focal Length: | 5.52 |
| F-Number: | 2.80 |
| Half Angle of View (°): | 90.00 |
| Image Height: | 8.75 |
| Overall Lens Length: | 91.31 |
| BF: | 14.83 |
| Position of Entrance Pupil: | 9.55 |
| Position of Exit Pupil: | −52.47 |
| Front Principal Position: | 14.61 |
| Rear Principal Position: | 9.31 |

-continued

ZOOM LENS UNIT DATA

| Unit | Starting Surface | Last Surface | Focal Length | Lens Structure Length | Front Principal Position | Rear Principal Position |
|------|-----------------|--------------|--------------|----------------------|--------------------------|-------------------------|
| L1 | 1 | 8 | −10.29 | 21.12 | 1.58 | −22.21 |
| L2 | 11 | 14 | 34.24 | 5.00 | 3.42 | 0.07 |
| L3 | 17 | 24 | 29.81 | 17.11 | 4.94 | −8.16 |

SINGLE LENS DATA

| Lens | Starting Surface | Focal Length |
|------|-----------------|--------------|
| 1 | 1 | −15.08 |
| 2 | 3 | −45.65 |
| 3 | 5 | −10.65 |
| 4 | 7 | 17.08 |
| 5 | 9 | 0.00 |
| 6 | 12 | −23.32 |
| 7 | 13 | 14.46 |
| 8 | 15 | 0.00 |
| 9 | 17 | 17.87 |
| 10 | 19 | −14.61 |
| 11 | 20 | 27.43 |
| 12 | 22 | −18.25 |
| 13 | 23 | 16.36 |

Various values according to each numerical example are summarized in the following Table 1.

TABLE 1

| | | Numerical Example 1 | Numerical Example 2 | Numerical Example 3 | Numerical Example 4 | Numerical Example 5 |
|---|---|---|---|---|---|---|
| Inequality (1) | (f1/f)/N | −0.84 | −1.24 | −1.12 | −1.05 | −1.03 |
| Inequality (2) | f2/f3 | 0.73 | 1.38 | 1.02 | 0.99 | 1.15 |
| Inequality (3) | f2/f | 5.28 | 7.77 | 6.26 | 5.70 | 6.21 |
| Inequality (4) | N1Ave | 1.95 | 1.95 | 1.86 | 1.95 | 1.99 |
| Inequality (5) | N1p | 2.00 | 2.00 | 2.00 | 2.00 | 1.81 |
| Inequality (6) | f2/L | 1.21 | 1.96 | 1.43 | 1.52 | 1.47 |
| Inequality (7) | f3/L | 1.67 | 1.42 | 1.40 | 1.52 | 1.28 |
| Inequality (8) | Npr | 1.88 | 1.80 | 2.00 | 1.80 | 1.80 |
| Inequality (9) | Dout/Din | 0.31 | 0.31 | 0.31 | 0.31 | 0.28 |
| Inequality (10) | ω | 105.0° | 95.0° | 105.0° | 90.0° | 90.0° |

Image Pickup Apparatus

Figure 12:
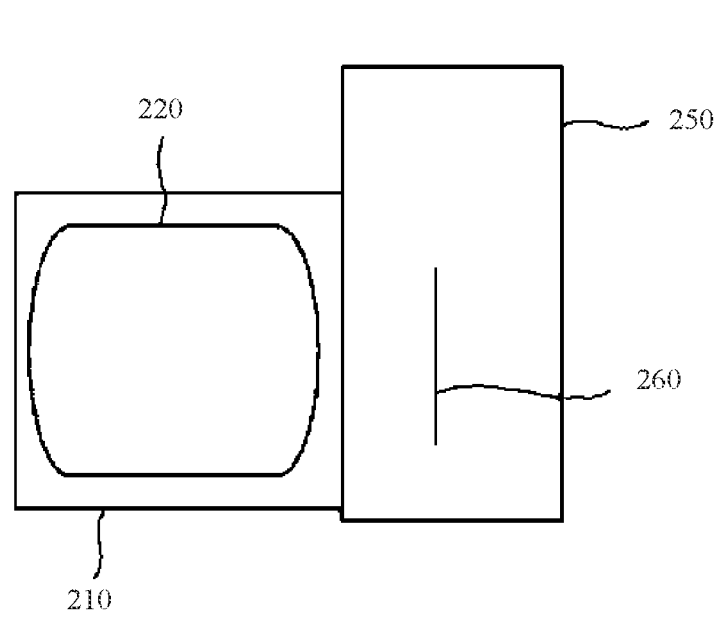
FIG. 12 is a schematic diagram of an image pickup apparatus.

Next, a description is given of an embodiment of an image pickup apparatus 200 of the present disclosure. FIG. 12 is a schematic diagram of the image pickup apparatus (digital still camera) 200 according to this embodiment. The image pickup apparatus 200 includes a camera body 250 having an image sensor 260 and a lens apparatus 210 including optical systems 220 similar to any of Examples 1 to 5 described above. The lens apparatus 210 and the camera body 250 may be integrally configured or may be detachably attachable to each other. The camera body 250 may be a so-called single-lens reflex camera having a quick turn mirror or a so-called mirrorless camera not having a quick turn mirror. The image sensor 260 is a solid-state image sensor (photo-electric conversion element), such as a CCD sensor and a CMOS sensor, that receives an optical image formed by each of the optical systems 220 and performs photoelectric conversion. Although only one optical system is illustrated in FIG. 12, two optical systems are arranged side by side in a depth direction.

By having the lens apparatus 210, the image pickup apparatus 200 in this embodiment can perform stereoscopic imaging in which one image sensor captures an image formed by each of the two optical systems, while being small and high-performance with a low cost.

The above-described optical system according to each example can be applied not only to the digital still camera illustrated in FIG. 12 but also to various image pickup apparatuses such as a broadcasting camera, a silver-halide film camera, and a monitoring camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-110916, filed on Jul. 2, 2021, which is hereby incorporated by reference herein in its entirety.

What is claimed is:

1. An optical system comprising, in order from an object side to an image side:

a first lens unit having a negative refractive power;

a first reflective member;

a second lens unit including an aperture diaphragm and having a positive refractive power;

a second reflective member; and a third lens unit having a positive refractive power, wherein the first lens unit includes all lenses disposed at the object side of the first reflective member in the optical system, wherein the second lens unit includes the aperture stop and all lenses disposed between the first reflective member and the second reflective member in the optical system, wherein the third lens unit includes all lenses disposed between the second reflective member and an image plane in the optical system, and wherein the following inequalities are satisfied:

$$1.27 < (f1/f)/Npr < -0.84$$

$$0.60 < f2/f3 < 1.60$$

$$4.80 < f2/f < 10.50$$

where f represents a focal length of the optical system, f1 represents a focal length of the first lens unit, f2 represents a focal length of the second lens unit, f3 represents a focal length of the third lens unit, and Npr represents a refractive index of the first reflective member.

2. The optical system according to claim 1, wherein the first lens unit includes:

two or more negative lenses; and one or more positive lenses.

3. The optical system according to claim 1, wherein a following inequality is satisfied:

$$1.78 < N1Aave < 2.20$$

where N1Aave represents an average refractive index at a d-line of a negative lens included in the first lens unit.

4. The optical system according to claim 1, wherein a following inequality is satisfied:

$$1.78 < N1p < 2.20$$

where N1p represents a refractive index at a d-line of a positive lens having a largest positive refractive power in the first lens unit.

5. The optical system according to claim 1, wherein a following inequality is satisfied:

$$1.00 < f2/LP < 2.40$$

where LP represents a distance on an optical axis between reflective surfaces of the first reflective member and the second reflective member.

6. The optical system according to claim 1, wherein a following inequality is satisfied:

$$1.00 < f3/LP < 2.20$$

where LP represents a distance on an optical axis between reflective surfaces of the first reflective member and the second reflective member.

7. The optical system according to claim 1, wherein a following inequality is satisfied: $1.78 < Npr < 2.20$.

8. The optical system according to claim 1, wherein a following inequality is satisfied:

$$85.0° < \omega < 120.0°$$

where $\omega$ represents a half angle of view (°) of the optical system.

9. The optical system according to claim 1, wherein the optical system consists of, in order from the object side to the image side, the first lens unit, the first reflective member, the second lens unit, the second reflective member, and the third lens unit.

10. A lens apparatus comprising two optical systems of a first optical system and a second optical system, wherein each of the first optical system and the second optical system includes, in order from an object side to an image side:

a first lens unit having a negative refractive power;

a first reflective member;

a second lens unit including an aperture diaphragm and having a positive refractive power;

a second reflective member; and a third lens unit having a positive refractive power, wherein the first lens unit includes all lenses disposed at the object side of the first reflective member in the optical system, wherein the second lens unit includes the aperture stop and all lenses disposed between the first reflective member and the second reflective member in the optical system, wherein the third lens unit includes all lenses disposed between the second reflective member and an image plane in the optical system, and wherein each of the first and second optical systems satisfies following inequalities:

$$-1.27 < (f1/f)/Npr < -0.84$$

$$0.60 < f2/f3 < 1.60$$

$$3.0 < f2/f < 10.50$$

where, f represents a focal length of the optical system, f1 represents a focal length of the first lens unit, f2 represents a focal length of the second lens unit, f3 represents a focal length of the third lens unit, and Npr represents a refractive index of the first reflective member.

11. The lens apparatus according to claim 10, wherein a following inequality is satisfied:

$$0.05 < Dout/Din < 0.50$$

where Din represents a distance between surface vertexes of respective most object side lenses in the two optical systems, and Dout represents a distance between surface vertexes of respective most image side lenses in the two optical systems.

12. The lens apparatus according to claim 10, wherein the two optical systems are arranged in parallel.

13. An image pickup apparatus comprising:

a lens apparatus including two optical systems of a first optical system and a second optical system; and an image sensor configured to capture an optical image formed by each of the two optical systems, wherein each of the first optical system and the second optical system includes, in order from an object side to an image side:

a first lens unit having a negative refractive power;

a first reflective member;

a second lens unit including an aperture diaphragm and having a positive refractive power;

a second reflective member; and a third lens unit having a positive refractive power, wherein the first lens unit includes all lenses disposed at the object side of the first reflective member in the optical system, wherein the second lens unit includes the aperture stop and all lenses disposed between the first reflective member and the second reflective member in the optical system, wherein the third lens unit includes all lenses disposed between the second reflective member and an image plane in the optical system, and wherein each of the first and second optical systems satisfies following inequalities:

$$-1.27 < (f1/f)/Npr < -0.84$$

$$0.60 < f2/f3 < 1.60$$

$$3.80 < f2/f < 10.50$$

where f represents a focal length of the optical system, f1 represents a focal length of the first lens unit, f2 represents a focal length of the second lens unit, f3 represents a focal length of the third lens unit, and Npr represents a refractive index of the first reflective member.

14. The image pickup apparatus according to claim 13, wherein an optical image formed by each of the two optical systems is imaged by the one image sensor.

\* \* \* \* \*